Figure 1:
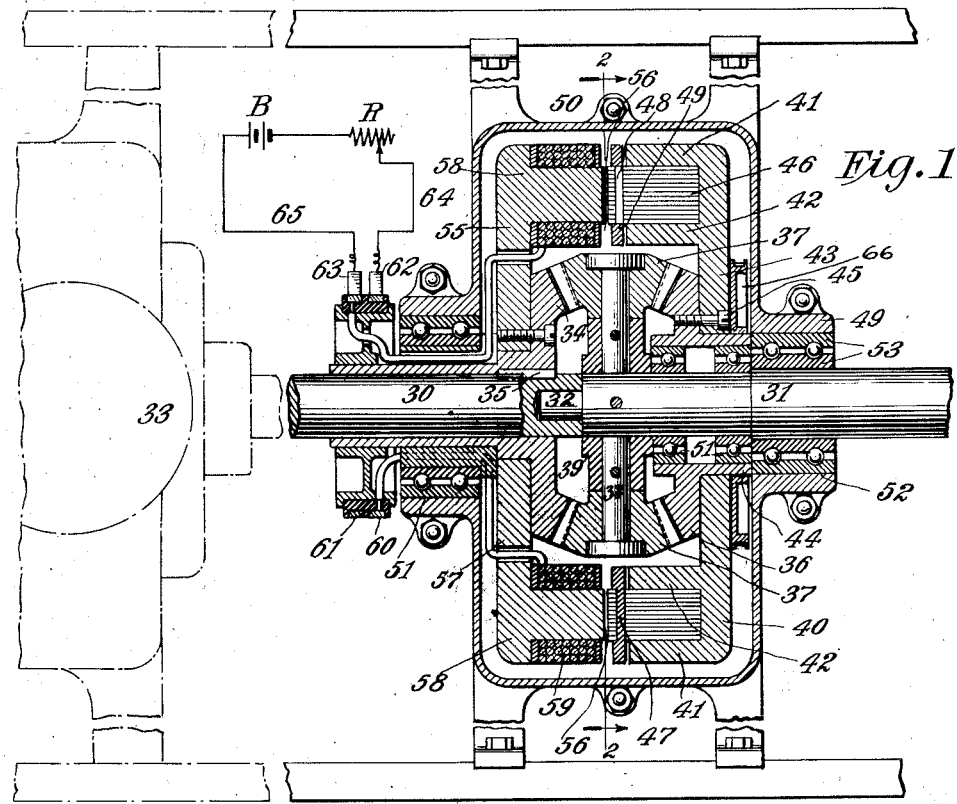

H. J. MURRAY.
POWER TRANSMISSION.
APPLICATION FILED JULY 11, 1916.

1,359,616.

Patented Nov. 23, 1920.

Inventor,
HOWARD J. MURRAY,
By his Attorney
Messmer + Austin.

UNITED STATES PATENT OFFICE.

HOWARD J. MURRAY, OF NEW YORK, N. Y.

POWER TRANSMISSION.

1,359,616.  Specification of Letters Patent. Patented Nov. 23, 1920.

Application filed July 11, 1916. Serial No. 108,587.

*To all whom it may concern:*

Be it known that I, HOWARD J. MURRAY, a citizen of the United States, and resident of New York city, in the county of Kings and State of New York, have invented certain new and useful Improvements in Power Transmission, of which the following is a specification.

My invention relates in general to a flexible power transmission and control mechanism and specifically relates to a device for selectively securing different speeds and torque values from a constantly driven variable speed power member.

One of the objects of my invention is to provide a simple form of dynamo electric machine designed first, to effect electrically the transmission of power from a driving member to a driven member, under such conditions that the torque and speed of the driven member may be varied at will to assume any required condition without varying the torque of the driving member; second, to vary at will the speed and torque ratio while transmitting power from a driving member to one or more driven members, and to economically increase or decrease by electrical means the power imparted to the driven member or members without affecting the power delivered by the driving member; third, to vary at will the speed and torque ratio while transmitting power from a driving member to two or more driven members, and to permit variation of the speed and torque ratio of the driven members with respect to each other, and to the speed and torque ratio of the driving member; fourth, to transmit power from one member to another member under such conditions that either member may become the driving member, while the other member becomes the driven member; fifth, to transmit power from a driving member to a driven member under such conditions that the speed and torque ratio of the driven member may be varied to approach and equal the value of the speed and torque ratio of the driving member, and to mechanically connect the driven member and the driving member for direct transmission of power when the speed and torque ratios of the members do approach or equal each other; sixth, to provide a sensitive and flexible form of electrically energized controlling organization for automatically and promptly effecting variations in the speed and torque ratios between the driving and driven members, with a minimum loss of energy in effecting said variations.

In one physical embodiment of my invention, I broadly attain the transmission of power by connecting the member carrying the inductors, with the driving member so that the inductors will be rotated mechanically in a direction opposite to the direction of rotation of the driving member. Thus the inductors are rotated in a direction opposite to the direction of rotation of the field producing means which is mechanically connected to the driving member, thereby giving a large "slip" value, or a greater difference of speed between the inductors and the field producing means, when compared to the "slip" or difference of speed created when revolving the armature and field producing means in the same direction.

While the invention is obviously capable of use in any location where it is desired to receive power from a driven member at variable speed, the invention is particularly applicable to an electrically controlled power transmission system designed for use in connection with automobile constructions and it is in connection with this particular use that the invention will be described in detail.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Figure 2:
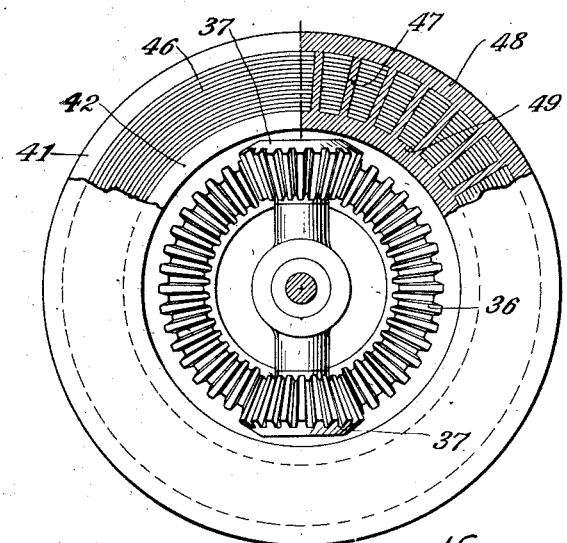

In the drawings:

Figure 1 is a physical embodiment of my invention in vertical section, taken axially of the main shaft and with coacting parts shown in dot and dash outline; and Fig. 2 is a transverse sectional view taken approximately upon the line 2—2 of Fig. 1, looking in the direction indicated by the arrows.

In the following description and in the claims, parts will be identified by specific names for convenience of expression but they are intended to be as generic in their application to similar parts as the art will permit.

There is shown a dynamo electric machine constituting a driving transmission and including a pair of shafts 30 and 31 disposed in axial alinement and with their adjacent ends interfitting to provide a mutual bearing 32. The shafts are mounted for independent rotary movement respectively in bearings hereinafter more particularly described and while either one of these shafts may be considered as the driven or as the driving member of the transmission, for the purpose of this description, it will be considered that the shaft 30 is the driving member and is operatively connected to be driven from a source of mechanical power, such as an internal combustion engine 33 or other suitable prime mover, shown in dotted outline. Accordingly, shaft 31 is regarded as the driven member and is operatively connected to whatever mechanism (not shown) is designed to be driven from the prime mover.

Connecting the contiguous ends of the shafts is a differential beveled gear train set formed of at least three gears meshing in order. The first gear 34 may be regarded as a driving gear as it is fixed by means of the key 35 to the shaft 30 so as to rotate about the axis thereof. The other two gears of the train may be regarded as driven gears with the end gear 36 loosely mounted for rotary movement upon the shaft 31 and with the teeth thereof facing the teeth of gear 34. As the gear 36 at this end of the train does not do any mechanical work, it will be identified as an idler gear, or due to a function hereinafter described this gear will be considered as a retarding gear. Both of the gears 34 and 36 are continuously in mesh with the intermediate gear 37 of the train. This gear 37 resembles the idler gear in the usual mechanical differential gear sets and likewise is mounted free to rotate about the axis of a transverse shaft 38 extending at right angles to the alined axes of the shafts 30 and 31. The shaft 38 is rigidly connected to and extends at right angles to the driven shaft 31 and is free to revolve with this driven shaft. Instead of a single intermediate gear connection between the gears 34 and 36, preferably two or more such gears are used, as shown, in order to minimize distortional strains on the shaft, but it is obvious that any number of intermediate gears may be positioned between the facing gears in order to drive one from the other, provided at least one of the shafts carrying the intermediate gears is fixed to the driven shaft 31. A filler block 39 is pinned to the end of the shaft 31 and to the shaft 38 to provide bearings for the gears 37 and to maintain the gears squarely in meshing position.

Fixed to and preferably forming an integral or rigidly connected part of the loosely mounted end or holding gear 36 is an alternating current rotor 40 loosely mounted for free rotary movement upon the shaft. The rotor is a casting including a pair of concentric rings 41 and 42 and a connecting backing plate 43 mounted on an extention 44 of the hub of the end gear 36 and demountably fixed thereto by means of the screw 45. Laminations 46 formed preferably of closely positioned thin iron sheets extend circumferentially of the rotor and are positioned between the rings as is usual with a. c. rotors of the ring type inductors. The armature inductors 47 and the inductor current rings 48 and 49 are preferably a one piece casting of any proper current conducting material, cast after the laminations 46 have been assembled. The differential set and parts connected therewith are contained within a casing 50 opposite sides of which are provided with cylindrical extensions 51 and 52 within which the shafts 30 and 31 are respectively centered. The extension 52 contains a ball bearing mounting 53 for the portion of the driven shaft 31 which extends into the casing. The shaft is reduced just within the casing and a plurality of ball bearings 54 are positioned between this reduced portion of the shaft and the hub extension 44.

Rigidly fixed to the driving gear 34 is a magnetic field producing member 55 mounted to face the rotor with the least possible air gap 56 therebetween. This member is formed of a disk shaped back plate 57 similar to the plate 43 and likewise tending to reinforce the gear centered in the face thereof. The parts of the differential set on this side are similar in construction to those described for the opposite side so that duplication of description is not regarded as necessary. A plurality of circumferentially spaced pole pieces 58 extend inwardly from the back plate 57 adjacent its periphery and project from the inner face thereof close to the face of the rotor. These pole pieces are preferably positioned as close together as their windings will permit and form a ring of pole pieces encircling the gear 34. Each of the pole pieces is wound with a conductor 59 constituting a field winding, the ends of which are connected to the sections of a conventional form of slip rings. Current may be conveyed to or taken off the slip rings 60 and 61 and brushes 62, 63 to which are connected lead wires 64, 65.

In one form of the device a mechanical brake 66 and preferably of the clutch band type is positioned to encircle the driven shaft and to act when in operative position to hold the retarding gear from rotating whenever a direct mechanical drive is desired. While it is obvious that the field winding conductors 59 may be energized electrically in different ways, let it be assumed in discussing one way in which the device may be arranged for use, that the circuits through the rotor inductors are closed on themselves, thus forming inductors when influenced by the field produced by the rotating member 55. The field windings may be positioned in a circuit which includes a source of energy such as a storage battery "B" and if desired a suitable rheostat "R" may also be included in the circuit to regulate the current strength through the field windings.

In operation, it will be understood in Fig. 1. first, that closing the field circuit a magnetic field of force is created about the pole pieces 58 and as the resistance is gradually taken out of the circuit as by manipulating the rheostat "R," a greater and greater density of magnetic field is produced. Under these conditions the driven shaft 31 is held stationary by its own inertia and due to the differential gear connection disclosed, the rotor will revolve at the same speed as the field member 55, but in the opposite direction. In other words if the field is revolving clock-wise, the rotor is traveling anti-clockwise. Motion will be conveyed from the driving shaft 30, through the driving gear 34, intermediate gears 37 to the holding or idler gear 36 which is rigidly attached to the freely floating rotor. It is evident that each section of the rotor becomes an inductor when current is induced therein by the revolving field. As is well understood the current in these inductors in turn will generate their own field of force in opposition to the field of force generated by the revolving field producing member. As the resistance in the field circuit is decreased the current, for any given condition, will begin to increase in proportion and at the same time the field formed by the revolving rotor will also increase in density until such time as the electric drag on the rotor will be greater than the inertia of the apparatus to which the driven shaft is attached. As the external control resistance is further decreased, the current in the field and of course the current in the inductors increases with a resulting increase in the drag on the rotor. This increase of drag will reach a condition where it begins to impose speed and torque on the intermediate gears and will increase in drag and the speed of the rotor will gradually decrease to a condition where it is almost held fixed in space.

If desired the mechanical brake may then be brought into play thus positively and mechanically holding the floating rotor and attached parts fixed. It will be understood that the force holding the rotor in space approaches a potential state with increase in the densities of the opposing fields while the force on the driven shaft 31 is always in a kinetic state or delivery foot pounds of work. For example, it is obvious that the rotor might be held fixed by means of the mechanical brake in which case the energy holding the rotor at rest is entirely potential. With the rotor held either mechanically by the brake or electrically by the magnetic fields present, motion is transmitted from the gear 34 to the intermediate gears 37 which revolve about the teeth of the held gear 36 and react through the transverse shafts to revolve the same and thus rotate the driven shaft 31.

By this means it is possible to start with the driving shaft rotating at any speed and by gradually increasing the current strength in the field producing member, the speed of the rotor may gradually be brought to zero, and the rotor revolved in the opposite direction. It is obvious that the mechanical brake may be used conjointly with, or as a substitute for the electric brake provided by the rotor and field producing members when coasting, and it is obvious that a machine may be organized whereby the electric transmission may be thrown out of operation and the mechanical brake brought into position to hold the rotor manually and thus secure direct mechanical transmission of power; or the change from one form of holding means to the other may be an automatic function of the speed of rotation of the holding gear and its attached parts. If the change is made when the speed of the rotor is passing through zero, there will be absolutely no shock or strain on the transmission system, and a minimum loss by friction on the mechanical brake.

Having thus described my invention, I claim:

1. A device of the class described, the combination of two disk like members facing each other and mounted for rotary movement about a common axis, one of said members constituting a means for creating an electromagnetic field of force, the other member being an alternating current rotor designed to constitute an inductor rotatably mounted in the field of force created by the said means, and a mechanical driving connection between said inductor and said means confined within the projected outlines of said two disk-like members and driven means operatively connected to said driving connection.

2. A device of the class described, the combination of means for creating an electro-magnetic field of force, an alternating current rotor designed to constitute an inductor rotatably mounted in the field of force created by the said means, said means and said rotor coacting to form a mechanism inclosing space, and a mechanical driving connection between said inductor and said means, and driven means operatively connected to said driving connection, said driving means operatively connected to produce a movement of said means and said inductor in opposite directions and substantially filling said space.

3. A device of the class described, including in combination with a shaft adapted to be driven from the prime mover, of a dynamo-electric machine including a pair of relatively movable elements mounted for movement about the axis of said shaft, one of said elements constituting a means for creating a field of force and the other of which constitutes an inductor operatively associated therewith, a source of electric energy, means for connecting said source electrically with said field-creating-means and a driving connection housed between said elements and operatively connecting said prime mover shaft and the element of said dynamo electric machine which is movable in space, said relatively movable elements positioned with an air gap therebetween which air gap extends in a plane at right angles to the axis of the shaft.

4. A device of the class described, including in combination with a shaft adapted to be driven from the prime mover, of a dynamo-electric machine including a pair of relatively movable elements disposed offset from each other in parallel planes, a differential gear set housed within the outlines of the relatively movable elements for providing relatively large differences in speed connecting said elements mechanically so that the rotation of one will rotate the other, one of which constitutes a means for creating a field of force and the other of which constitutes an inductor operatively associated therewith, a source of electric energy, means connecting said source electrically with said field-creating-means and a driving connection between said prime mover shaft and the element of said dynamo electric machine which is movable in space.

5. A device of the class described including a differential gear set formed of a driving gear, a field producing means carried thereby, a loosely mounted gear, an idler gear meshing with both of said gears and mounted for revolving movement, a driven member operatively connected with said idler gear to be actuated by the revolving movement thereof, a rotor carried by said driven member and designed to constitute an inductor coactively associated with said field producing means, and braking means for holding the loosely mounted gear thereby to cause the driving gear to revolve the idler gear on the loosely mounted gear and thus rotate the driven member.

6. A dynamo electric machine including means for creating an electro-magnetic field of force, an inductor forming part of a closed circuit and designed to be passed through said field to generate a field of force in opposition to the first named field, mechanical means operatively connected to the field of force creating means for moving said inductor in a direction opposite to the natural direction of movement of said inductor when under the influence of said fields of force and manually actuated braking means for retarding the movement of said inductor.

7. A power transmission including a differential gear set formed of a driving gear, a loosely mounted gear, an idler gear meshing with both of said first named gears and mounted for revolving movement, a driven member operatively connected with said idler gear to be actuated by the revolving movement thereof and two different instrumentalities, one constituting a mechanical brake and the other constituting means for producing an electromagnetic field of force, each operatively connected for retarding the movement of the loosely mounted gear thereby to cause the driving member to revolve the idler gear on the loosely mounted gear and thus rotate the driven member.

8. In a device of the class described, a differential set including two facing gears rotatably mounted about a common axis, a driven shaft rotatable about said axis, a stub shaft carried by said driven shaft, an intermediate gear loose on said stub shaft, disposed between and meshing with both of the facing gears, a field creating means carried by one of the facing gears, an inductor carried by the other facing gear and means for braking the inductor carrying gear.

9. A device of the class described including an organization comprising a pair of ring-like members disposed in parallel planes offset from each other and mounted face to face for rotary movement about a common axis, one of said members constituting means for creating an electromagnetic field of force and the other member constituting an inductor operatively associated therewith and a differential gear set contained within the outlines of said pair of ring-like members and mechanically connecting the members, the end members of said gear sets attached to said ring-like members, and idler members of said gear set disposed between the end members and acting to maintain the ring-like members in their preset relative position.

10. In a device of the class described, the combination of a pair of plates disposed in parallel planes offset from each other and mounted for rotary movement about a common axis, ring-like means projecting toward each other from the outer portions of said plates for creating electric fields of force tending to oppose relative movement between the plates and a differential gear set housed between the plates and within the outlines of said ring-like projecting means for mechanically connecting said plates.

Signed at New York city in the county of New York and State of New York this 23d day of June, A. D. 1916.

HOWARD J. MURRAY.